United States Patent
Kim et al.

(10) Patent No.: US 11,113,360 B2
(45) Date of Patent: Sep. 7, 2021

(54) PLANT ABNORMALITY PREDICTION SYSTEM AND METHOD

(71) Applicant: DOOSAN HEAVY INDUSTRIES & CONSTRUCTION CO., LTD., Changwon-si (KR)

(72) Inventors: Hyun Sik Kim, Gimpo-si (KR); Jee Hun Park, Gwangmyeong-si (KR)

(73) Assignee: DOOSAN HEAVY INDUSTRIES & CONSTRUCTION C, Changwon-si (KR)

( * ) Notice: Subject to any disclaimer, the term of this patent is extended or adjusted under 35 U.S.C. 154(b) by 202 days.

(21) Appl. No.: 16/231,687

(22) Filed: Dec. 24, 2018

(65) Prior Publication Data

US 2019/0243870 A1   Aug. 8, 2019

(30) Foreign Application Priority Data

Feb. 7, 2018   (KR) ........................ 10-2018-0014857

(51) Int. Cl.
*G06F 17/15*      (2006.01)
*G06F 16/9035*    (2019.01)
*G06F 17/11*      (2006.01)

(52) U.S. Cl.
CPC .......... *G06F 17/15* (2013.01); *G06F 16/9035* (2019.01); *G06F 17/11* (2013.01)

(58) Field of Classification Search
CPC ....... G06F 17/11; G06F 17/15; G06F 16/9035
See application file for complete search history.

(56) References Cited

U.S. PATENT DOCUMENTS

2012/0271826 A1* 10/2012 Kim ................ G06Q 10/06
                                                                707/737

FOREIGN PATENT DOCUMENTS

| JP | 2017130081 A | 7/2017 |
|---|---|---|
| KR | 10-1096793 B1 | 12/2011 |
| KR | 10-2015-0096142 A | 8/2015 |
| KR | 10-1597939 B1 | 2/2016 |

OTHER PUBLICATIONS

A Korean Office Action dated Jun. 20, 2019 in connection with Korean Patent Application No. 10-2018-0014857 which corresponds to the above-referenced U.S. application.

A Korean Notice of Allowance dated Aug. 30, 2019 in connection with Korean Patent Application No. 10-2018-0014857 which corresponds to the above-referenced U.S.

* cited by examiner

*Primary Examiner* — Michael D. Yaary

(74) *Attorney, Agent, or Firm* — Invenstone Patent, LLC

(57) ABSTRACT

A system and method predict whether or not a plant is abnormal and perform an accurate prediction even if a modeling is executed in a state where the understanding for a target to abnormality determination is low, or when a person unfamiliar with system designs a prediction model. The system includes a correlation coefficient calculation unit for calculating a correlation coefficient for each of two tags among a plurality of tags; a relevant tag determination unit for determining a relevant tag for each tag of the plurality of tags by comparing the correlation coefficient with a reference value; and an independent tag determination unit for determining one or more among the plurality of tags as an independent tag based on the relevant tag. The relevant tag determination unit includes primary and second tag extraction sections for extracting primary and second tags for each tag of the plurality of tags.

12 Claims, 4 Drawing Sheets

[FIG. 1]
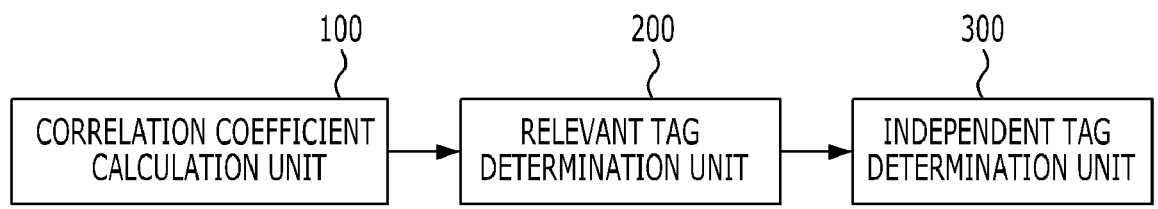

[FIG. 2]
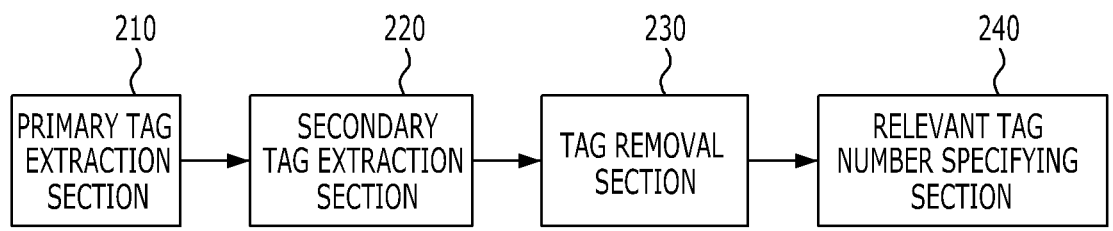

[FIG. 3]
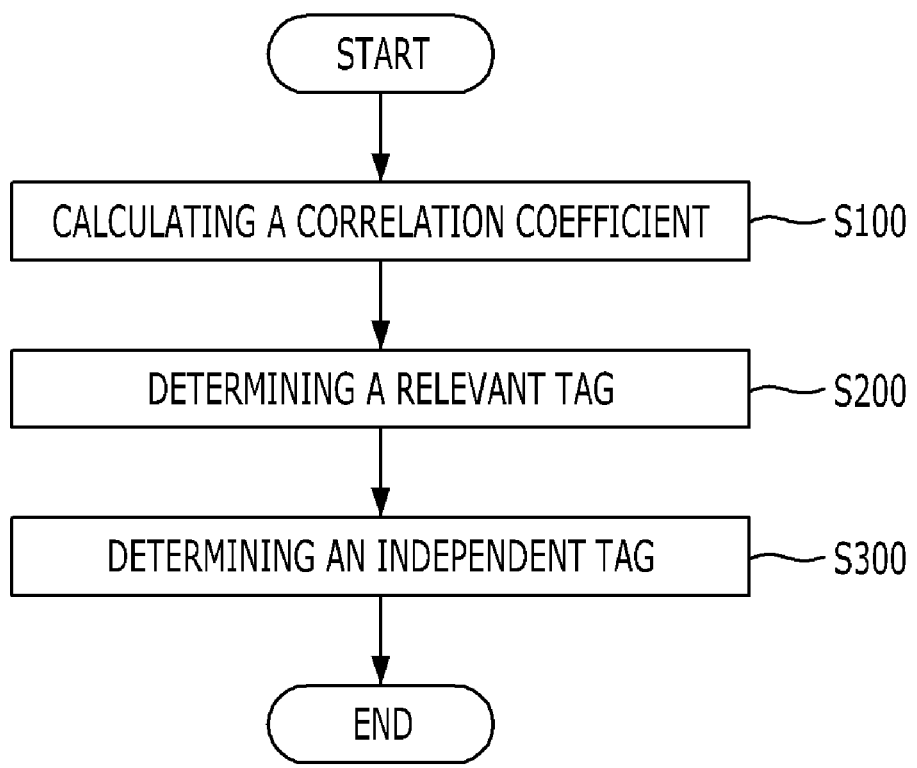

[FIG. 4]
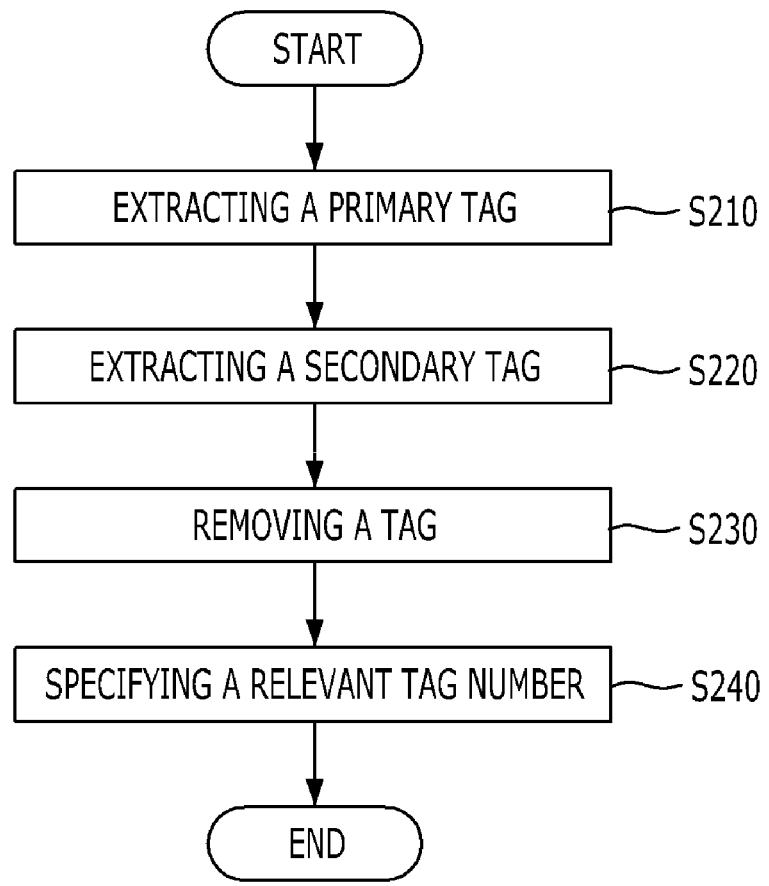

PLANT ABNORMALITY PREDICTION SYSTEM AND METHOD

CROSS-REFERENCE TO RELATED APPLICATIONS

This application claims priority to Korean Patent Application No. 10-2018-0014857, filed on Feb. 7, 2018, which is incorporated herein by reference in their entirety.

BACKGROUND OF THE DISCLOSURE

Field of the Disclosure

The present disclosure relates to a system for predicting whether or not a plant is abnormal, and more particularly, to a plant abnormality prediction system, which may perform an accurate prediction even if a modeling is executed in a state where the understanding for a target to abnormality determination is low.

Description of Related Art

A precise prediction model should be designed in order to reliably determine whether or not a system is abnormal. In addition, when an input tag and an output tag of the model are improperly designed, there is a possibility that an inaccurate model may be constructed. Conventionally, tags having no causation have constituted a single model, such that the presence or absence of an abnormality has been not precisely predicted. In addition, conventionally, input tags have been input by which the transition of the number over time is approximate among a plurality of input tags, thus resulting in inaccurate prediction results.

In order to solve such a problem, it is necessary to analyze the correlation between the tags, to generate a group to exclude the tag having a very high correlation for each tag through a clustering operation, and to determine an independent tag based on the group.

In addition, it is necessary to perform the prediction through various algorithms according to whether or not it is an independent tag for each tag.

SUMMARY OF THE DISCLOSURE

An object of the present disclosure is to implement a plant abnormality prediction system, and method, which may perform an accurate prediction even when a person who insufficiently understands a system designs a prediction model.

Another object of the present disclosure is to analyze the correlation between the tags through the correlation analysis, to generate a group to exclude the tag having a very high correlation for each tag through a clustering operation, and to determine an independent tag based on the group.

Still another object of the present disclosure is to perform a prediction through algorithms according to whether or not it is an independent tag for each tag.

Meanwhile, the objects of the present disclosure are not limited to the above-described technical objects, and may include various technical objects within a scope that is obvious to those skilled in the art from the following description.

According to one aspect of the present disclosure, there is provided a system for predicting plant abnormality. The system may include a correlation coefficient calculation unit for calculating a correlation coefficient for each of two tags among a plurality of tags; a relevant tag determination unit for determining a relevant tag for each tag of the plurality of tags by comparing the correlation coefficient with a reference value; and an independent tag determination unit for determining one or more among the plurality of tags as an independent tag based on the relevant tag.

The relevant tag determination unit may include a primary tag extraction section for extracting a primary tag for each tag of the plurality of tags, the extracted primary tag being a tag wherein an absolute value of the correlation coefficient is less than a first upper limit and is not less than a first lower limit. The relevant tag determination unit may further include a secondary tag extraction section for extracting a secondary tag for each tag, the extracted secondary tag being tag wherein an absolute value of the correlation coefficient is less than a second upper limit and is not less than a second lower limit. The first lower limit may be less than the second lower limit, and the first upper limit may be equal to the second upper limit.

The relevant tag determination unit may further include a tag removal section for removing some tags from the extracted primary tag for each tag, the removed tags including at least one tag among the secondary tags.

For plural secondary tags classified into one or more groups, the removed tags may include at least one secondary tag for each group.

The relevant tag determination unit may further include a relevant tag number specifying section for determining a relevant tag having had some tags removed from the extracted primary tag for each tag, and for specifying a count of the relevant tags.

The independent tag determination unit may be configured to determine a specific tag as an independent tag when the count of the relevant tags of the specific tag is less than a specific percentage relative to an entire number of tags.

The independent tag determination unit may be configured to determine a specific tag as a dependent tag when the count of the relevant tags of the specific tag is not less than a specific percentage relative to an entire number tags.

According to another aspect of the present disclosure, there is provided a method for predicting plant abnormality. The method may include steps of calculating a correlation coefficient for each of two tags among a plurality of tags; determining a relevant tag for each tag of the plurality of tags by comparing the correlation coefficient with a reference value; and determining one or more among the plurality of tags as an independent tag based on the relevant tag.

BRIEF DESCRIPTION OF THE DRAWINGS

FIG. 1 is a block diagram of a plant abnormality prediction system according to an embodiment.

FIG. 2 is a block diagram of the relevant tag determination unit of FIG. 1.

FIG. 3 is a flowchart of a plant abnormality prediction method according to an embodiment.

FIG. 4 is a flowchart detailing the step of determining a relevant tag of FIG. 3.

DESCRIPTION OF SPECIFIC EMBODIMENTS

The foregoing and further aspects are embodied through the embodiments described with reference to the accompanying drawings. It is to be understood that the components of each embodiment are capable of various combinations within the embodiments as long as they are not mutually exclusive or mutually contradictory. In addition, the present disclosure may be implemented in many various forms and is not limited to the embodiments described herein.

In order to clearly illustrate the claimed disclosure, parts not related to the description are omitted, and like parts are denoted by similar reference numerals throughout the specification. Then, it will be understood that when an element is referred to as "comprising" another element, the element is intended not to exclude other elements, but to further include other elements unless the context clearly indicates otherwise.

In addition, throughout this specification, when an element is referred to as being "connected" to another element, it may be "directly connected" to the other element or "electrically connected" to the other element with other elements interposed therebetween. In addition, in the specification, a signal means a quantity of electricity such as a voltage or a current.

As described in the specification, the term "unit" refers to "a block configured to change or plug-in the system of hardware or software," that is, a unit or a block that performs a specific function in hardware or software.

FIG. 1 illustrates a configuration of a plant abnormality prediction system according to an embodiment.

The plant abnormality prediction system includes a correlation coefficient calculation unit 100 for calculating correlation coefficients for two tags among a plurality of tags; a relevant tag determination unit 200 for determining a relevant tag for each tag by comparing the correlation coefficient with a reference value; and an independent tag determination unit 300 for determining one or more (i.e., at least one) among the plurality of tags as an independent tag based on the relevant tag.

The correlation coefficient calculation unit 100 calculates correlation coefficients for two tags among the plurality of tags. Herein, the tag is an input of the plant abnormality prediction system and is an element that affects an abnormality diagnosis target. Referring to FIG. 1, the tag is an input of the correlation coefficient calculation unit 100 and is a component that has causation with the abnormality diagnosis target. A tag may include any element having causation with the abnormality diagnosis target. The abnormality diagnosis target is a target to be inspected and the above-described tag may also become the abnormality diagnosis target. That is, the tag represents a physical quantity accompanied with a plant operation, and the tags affect each other.

For example, when the abnormality diagnosis target is the speed of a motor, typically measured in revolutions per minute (rpm), the input current or voltage of the motor may be a tag. When the outlet temperature of a pump is the abnormality diagnosis target, the inlet temperature of the pump may be a tag.

The correlation coefficient calculation unit 100 calculates a correlation coefficient r based on Equation 1 with respect to tags x, y and a number of samples n.

$$r = \frac{\sum_{i=1}^{n}(x_i - \bar{x})(y_i - \bar{y})/(n-1)}{\sqrt{\sum_{i=1}^{n}(x_i - \bar{x})^2/(n-1)} \cdot \sqrt{\sum_{i=1}^{n}(y_i - \bar{y})^2/(n-1)}} \quad \text{Equation 1}$$

In the above equation, n denotes the number of samples; x and y denote tags; $\bar{x}$ denotes a sample mean for x; $\bar{y}$ denotes a sample mean for y; $x_i$ denotes the $i^{th}$ count of x; $y_i$ denotes the $i^{th}$ count of y; and r is a calculated correlation coefficient.

Tag x and tag y may be the same tag, whereby the correlation coefficient is 1, or may be different tags. The correlation coefficient calculation unit 100 calculates correlation coefficients for two tags, based on Equation 1, and calculates correlation coefficients for all tags.

Table 1 shows correlation coefficients calculated for ten tags by the correlation coefficient calculation unit 100, which calculates a correlation coefficient based on Equation 1. As can be seen, in each instance, the correlation coefficient is a value between −1 and +1.

TABLE 1

|  | Tag 1 | Tag 2 | Tag 3 | Tag 4 | Tag 5 | Tag 6 | Tag 7 | Tag 8 | Tag 9 | Tag 10 |
| --- | --- | --- | --- | --- | --- | --- | --- | --- | --- | --- |
| Tag 1 | 1 | 0.999 | 0.9 | −0.999 | 0.6 | 0.8 | −0.1 | −0.3 | 0.4 | 0.7 |
| Tag 2 | 0.999 | 1 | 0.7 | 0.999 | 0.2 | −0.97 | 0.3 | 0.8 | 0.3 | −0.8 |
| Tag 3 | 0.9 | 0.7 | 1 | 0.8 | 0.1 | −0.9 | 0.1 | 0.6 | 0.2 | −0.7 |
| Tag 4 | −0.999 | 0.999 | 0.8 | 1 | 0.8 | 0.8 | 0.3 | 0.5 | −0.1 | 0.8 |
| Tag 5 | 0.6 | 0.2 | 0.1 | 0.8 | 1 | 0.7 | 0.4 | −0.8 | −0.4 | 0.9 |
| Tag 6 | 0.8 | −0.97 | −0.9 | 0.8 | 0.7 | 1 | 0.6 | 0.7 | 0.2 | −0.999 |
| Tag 7 | −0.1 | 0.3 | 0.1 | 0.3 | 0.4 | 0.6 | 1 | 0.6 | −0.1 | 0.9 |
| Tag 8 | −0.3 | 0.8 | 0.6 | 0.5 | −0.8 | 0.7 | 0.6 | 1 | 0.3 | 0.9 |
| Tag 9 | 0.4 | 0.3 | 0.2 | −0.1 | −0.4 | 0.2 | −0.1 | 0.3 | 1 | −0.5 |
| Tag 10 | 0.7 | −0.8 | −0.7 | 0.8 | 0.9 | −0.999 | 0.9 | 0.9 | −0.5 | 1 |

The relevant tag determination unit 200 determines a relevant tag for each tag by comparing the correlation coefficient with a reference value. That is, the relevant tag determination unit 200 determines the relevant tag based on the calculated correlation coefficient for each tag, and the relevant tag may be not present or may include one or more tags. Details in which the relevant tag determination unit 200 determines the relevant tag will be described later.

The independent tag determination unit 300 determines one or more among the plurality of tags as an independent tag based on the relevant tag. Details of the independent tag determination unit 300 will be described later.

FIG. 2 illustrates a configuration of the relevant tag determination unit 200 according to an embodiment.

Referring to FIG. 2, the relevant tag determination unit 200 includes a primary tag extraction section 210 for extracting a primary tag for each tag. The primary tag is a tag wherein the absolute value of the correlation coefficient is less than a first upper limit and is greater than or equal to (i.e., not less than) a first lower limit. The first upper limit is 1 or less, for example, and may be specifically 1. The first lower limit is 0.7 or more, for example, and may be specifically 0.8.

The primary tags extracted for each tag, that is, as extracted by the primary tag extraction section 210, are shown in Table 2.

TABLE 2

| Tag | Primary Tag Nos. |
|---|---|
| Tag 1 | 2, 3, 4, 6, 10 |
| Tag 2 | 1, 3, 4, 6, 8, 10 |
| Tag 3 | 1, 2, 4, 6, 10 |
| Tag 4 | 1, 2, 3, 5, 6, 10 |
| Tag 5 | 4, 6, 8, 10 |
| Tag 6 | 1, 2, 3, 4, 5, 8, 10 |
| Tag 7 | 10 |
| Tag 8 | 2, 5, 6, 10 |
| Tag 9 | |
| Tag 10 | 1, 2, 3, 4, 5, 6, 7, 8 |

In Table 2, the numbers of the righthand column specify primary tags for each tag. For example, the primary tags for Tag 1 are tags 2, 3, 4, 6, and 10, and there is no primary tag for Tag 9.

In other words, the primary tag extraction section 210 performs a primary filtering based on the calculated correlation coefficient. The primary filtering means that the primary tag extraction section 210 extracts the tags having a certain degree of correlation for each tag.

The relevant tag determination unit 200 further includes a secondary tag extraction section 220 for extracting a secondary tag for each tag. The secondary tag is a tag wherein the absolute value of the correlation coefficient is less than a second upper limit and is greater than or equal to (i.e., not less than) a second lower limit. The second upper limit is 1 or less, for example, and may be specifically 1. The second lower limit is 0.8 or more, for example, and may be specifically 0.999.

The secondary tags extracted for each tag, that is, as extracted by the secondary tag extraction section 220, are shown in Table 3.

TABLE 3

| Tag | Secondary Tag Nos. |
|---|---|
| Tag 1 | 2, 4 |
| Tag 2 | 1, 4 |
| Tag 4 | 1, 2 |
| Tag 6 | 10 |
| Tag 10 | 6 |

In Table 3, the numbers of the righthand column specify the secondary tags for each tag. For example, the secondary tags for Tag 1 are tags 2 and 4, and the secondary tag for Tag 6 is tag 10. Thus, referring to the extracted secondary tags for each tag, it may be confirmed that the secondary tags are classified into one or more groups. That is, in the above example, one secondary tag group consists of tags 1, 2, and 4, and the other secondary tag group consists of tags 6 and 10.

As described above, while the first upper limit in the primary tag extraction section 210 is equal to the second upper limit in the secondary tag extraction section 220, the first lower limit is less (lower) than the second lower limit. That is, the secondary tag extraction section 220 extracts tags having a higher correlation for each tag than does the primary tag extraction section 210.

The relevant tag determination unit 200 further includes a tag removal section 230 for removing some tags from the extracted primary tags for each tag. Here, the removed tags include at least one tag among the secondary tags. The tag removal operation of the tag removal section 230 removes at least one tag among the secondary tags from the extracted primary tags, whereby a secondary tag having a very high degree of correlation may be removed from the primary tags having a certain degree of correlation.

In the tag removal section 230, the tags to be removed include at least one secondary tag for each group when there are plural secondary tags classified into one or more groups.

The results achieved by the tag removal section 230, in which some tags are removed from the extracted primary tags for each tag, are shown in Table 4.

TABLE 4

| Tag | Primary Tag Nos. after tag removal |
|---|---|
| Tag 1 | 3, 6 |
| Tag 2 | 3, 6, 8 |
| Tag 3 | 1, 6 |
| Tag 4 | 1, 3, 5, 6 |
| Tag 5 | 4, 6, 8 |
| Tag 6 | 1, 3, 5, 8 |
| Tag 7 | 10 |
| Tag 8 | 2, 5, 6 |
| Tag 9 | |
| Tag 10 | 1, 3, 5, 7, 8 |

In Table 4, it may be confirmed that, for Tag 1, for example, the primary tags removed by an operation of the tag removal section 230 are tags 2, 4, and 10 among primary tags 2, 3, 4, 6, and 10 as shown in Table 2.

Meanwhile, as described in relation to Table 3, one secondary tag group may consist of tags 1, 2, and 4 and the other secondary tag group may consist of tags 6 and 10. Accordingly, in the example of Tag 1 per Table 4, it may be confirmed that the tags of the above-described one secondary tag group, namely, tags 2 and 4, have been removed from the primary tags for Tag 1, in which group the tag 1 naturally remains. In addition, it may be confirmed that tag 10, which is one among tags 6 and 10 (i.e., the tags of the above-described other secondary tag group), has also been removed from the primary tags for Tag 1.

In the tag removal section 230, when there are plural secondary tags classified into one or more groups, the tags to be removed include at least one secondary tag for each group. Moreover, the tags to be removed may include only the remaining tags excluding itself in the secondary tag groups including itself for each tag.

In addition, the tags to be removed may include a tag having a low sequence number among the tags of the secondary tag groups that do not include itself for each tag. The tags to be removed are not limited to these, and may include a tag having a high sequence number among the tags of the secondary tag groups that do not include itself for each tag. Herein, the tag indicated as having a high sequence number is a tag identified by a larger number, and the tag indicated as having a low sequence number is a tag identified by a smaller number in the above-described example.

The relevant tags determined by the relevant tag determination unit 200 are a final set of tags in which some tags have been removed from the extracted primary tag for each tag. At this time, the tag having no the primary tag itself has no relevant tag. In the above-described example, Tag 9 has no primary tag, no secondary tag, and no relevant tag. For the tag having no relevant tag, when there are plural secondary tags classified into one or more groups, the relevant tag determination unit 200 determines the remaining tags excluding at least one tag for each group as a relevant tag.

In the above-described example, the relevant tag of Tag 9 is not present. In this case, the relevant tag determination unit 200 may determine tags 1, 3, 5, 6, 7, and 8 as the relevant tag of Tag 9 by excluding at least one tag for each secondary tag group.

Therefore, in the above-described example, the finally determined relevant tags for each tag are shown in Table 5.

TABLE 5

| Tag | Finally determined relevant tag Nos. |
| --- | --- |
| Tag 1 | 3, 6 |
| Tag 2 | 3, 6, 8 |
| Tag 3 | 1, 6 |
| Tag 4 | 1, 3, 5, 6 |
| Tag 5 | 4, 6, 8 |
| Tag 6 | 1, 3, 5, 8 |
| Tag 7 | 10 |
| Tag 8 | 2, 5, 6 |
| Tag 9 | 1, 3, 5, 6, 7, 8 |
| Tag 10 | 1, 3, 5, 7, 8 |

The relevant tag determination unit 200 further includes a relevant tag number specifying section 240 for determining a set of relevant tags that has had removed some tags from the extracted primary tags for each tag, and for specifying the number (count) of the relevant tags.

Based on the finally determined relevant tags for each tag as shown in Table 5 above, the number (count) of the relevant tags specified for each tag by the relevant tag number specifying section 240 is shown in Table 6.

TABLE 6

| Tag (count) | Finally determined relevant tag Nos. |
| --- | --- |
| Tag 1 (two) | 3, 6 |
| Tag 2 (three) | 3, 6, 8 |
| Tag 3 (two) | 1, 6 |
| Tag 4 (four) | 1, 3, 5, 6 |
| Tag 5 (three) | 4, 6, 8 |
| Tag 6 (four) | 1, 3, 5, 8 |
| Tag 7 (one) | 10 |
| Tag 8 (three) | 2, 5, 6 |
| Tag 9 (six) | 1, 3, 5, 6, 7, 8 |
| Tag 10 (five) | 1, 3, 5, 7, 8 |

Referring again to FIG. 1, the independent tag determination unit 300 determines one or more among the plurality of tags as an independent tag based on the relevant tag. Specifically, when a count of the relevant tags of a specific tag is less than a specific percentage relative to the entire number of tags, the independent tag determination unit 300 may determine the specific tag as an independent tag. Conversely, when the count is greater than or equal to (i.e., not less than) the specific percentage, the independent tag determination unit 300 may determine the specific tag as a dependent tag.

A tag type determined for each tag by the independent tag determination unit 300 is shown in Table 7.

TABLE 7

| Tag | Tag type |
| --- | --- |
| Tag 1 | dependent |
| Tag 2 | dependent |
| Tag 3 | dependent |
| Tag 4 | dependent |
| Tag 5 | dependent |
| Tag 6 | dependent |

TABLE 7-continued

| Tag | Tag type |
| --- | --- |
| Tag 7 | independent |
| Tag 8 | dependent |
| Tag 9 | independent |
| Tag 10 | dependent |

The independent tag determination unit 300 determines a specific tag as an independent tag when the count of the relevant tags of the specific tag is less than a specific percentage relative to the entire number of tags (ten, in this example), and the specific percentage may be 20%, for example. Therefore, in the above-described example, when the count of the relevant tags is less than two, the specific tag may be determined as an independent tag. Here, Tag 7 having less than two relevant tags is an independent tag, and Tags 1, 2, 3, 4, 5, 6, 8, and 10 each having two or more relevant tags are dependent tags.

However, Tag 9 may be determined as an independent tag in the above-described example, even if it has two or more relevant tags, since Tag 9 is a tag having no primary tag. That is, when a tag has no primary tag extracted by the primary tag extraction section 210, the independent tag determination unit 300 determines such a tag as an independent tag.

As a result, the plant abnormality prediction system determines a relevant tag for each tag, and determines whether or not it is an independent tag or a dependent tag for each tag. Here, the relevant tag for any one tag is an input tag for predicting the any one tag. At this time, the plant abnormality prediction system performs k-NN-based prediction by using as an input the relevant tag for the tag determined as the independent tag. In addition, the plant abnormality prediction system performs k-NN-based prediction, MLRM-based prediction, or ensemble-based prediction by using as an input the relevant tag for the tag determined as the dependent tag. Therefore, an operator unfamiliar with the plant system may set a tag that is not helpful for the abnormal prediction of a specific tag as an input in order to diagnose the abnormality of the specific tag. Even if tags that are not related to the tag that is an abnormality prediction target are input, the plant abnormality prediction system extracts the relevant tag that is helpful for the abnormality prediction of the tag for each tag according to the above-described procedure, such that the unrelated tags are naturally excluded from the relevant tag.

That is, according to the plant abnormality prediction system, even if the tags are randomly input, the tags having causation with each other are grouped to set a relationship equation between the grouped tags, such that the tag may be input without understanding the plant system.

FIG. 3 illustrates a plant abnormality prediction method according to an embodiment.

The plant abnormality prediction method includes calculating correlation coefficients for two tags among a plurality of tags in a step S100; determining a relevant tag for each tag by comparing the correlation coefficient with a reference value in a step S200; and determining an independent tag that determines one or more among the plurality of tags as an independent tag based on the relevant tag in a step S300.

The step S100 calculates correlation coefficients for two tags among a plurality of tags. As described with respect to FIG. 1, the tag is an input of the plant abnormality prediction system and is an element that affects an abnormality diagnosis target. Specifically, the tag is an input of the correlation coefficient calculation unit 100 and is a component that has causation with the abnormality diagnosis target. A tag may include any element having causation with the abnormality diagnosis target. The abnormality diagnosis target is a target to be inspected and the above-described tag may also become the abnormality diagnosis target. That is, the tag represents a physical quantity accompanied with a plant operation, and the tags affect each other.

The calculating of the correlation coefficient in the step S100 calculates the correlation coefficient r based on the above Equation 1 with respect to tags x, y and a number of samples n. Here, tag x and tag y may be the same tag, whereby the correlation coefficient is 1, or may be different tags, and the step S100 calculates correlation coefficients for two tags based on the above-described Equation 1, and calculates correlation coefficients for all tags. The correlation coefficient may be a value between −1 and +1, as shown in the above Table 1.

The step S200 determines a relevant tag for each tag by comparing the correlation coefficient with a reference value. That is, the determining of the relevant tag in the step S200 determines the relevant tag based on the calculated correlation coefficient for each tag, and the relevant tag may be not present or may include one or more tags. Details in which the step S200 determines the relevant tag will be described later.

The step S300 determines one or more among the plurality of tags as an independent tag based on the relevant tag. Details of the step S300 will be described later.

FIG. 4 details the step of determining a relevant tag (S200) according to an embodiment.

The step S200 includes a step S210 of extracting a primary tag for each tag. As described with respect to FIG. 2, the primary tag is a tag wherein the absolute value of the correlation coefficient is less than a first upper limit and is greater than or equal to (i.e., not less than) a first lower limit. The first upper limit is 1 or less, for example, and may be specifically 1. The first lower limit is 0.7 or more, for example, and may be specifically 0.8. The primary tags extracted for each tag, that is, as extracted in the step S210, are shown in the above Table 2.

In other words, the step S210 performs a primary filtering based on the calculated correlation coefficient. The primary filtering means that the extracting of the primary tag, as performed in the step S210, extracts the tags having a certain degree of correlation for each tag.

The step S200 further includes a step of S220 of extracting a secondary tag for each tag. As described with respect to FIG. 2, the secondary tag is a tag wherein the absolute value of the correlation coefficient is less than a second upper limit and is greater than or equal to (i.e., not less than) a second lower limit. The second upper limit is 1 or less, for example, and may be specifically 1. The second lower limit is 0.8 or more, for example, and may be specifically 0.999. The secondary tags extracted for each tag, that is, as extracted in the step S220, are shown in the above Table 3.

As described above, while the first upper limit of the step S210 is equal to the second upper limit of the step S220, the first lower limit is less (lower) than the second lower limit. That is, the step S220 extracts tags having a higher correlation for each tag than does the step S210.

The step S200 further includes a step S230 of removing a tag, whereby some tags are removed from the extracted primary tags for each tag, the removed tags including at least one tag among the secondary tags. The step S230 removes at least one tag among the secondary tags from the extracted primary tags, whereby a secondary tag having a very high degree of correlation may be removed from the primary tags having a certain degree of correlation. The tags to be removed in the step S230 include at least one secondary tag for each group when there are plural secondary tags classified into one or more groups.

The results achieved by the step S230, in which some tags are removed from the extracted primary tags for each tag, are shown in the above Table 4.

In the step S230, when there are plural secondary tags classified into one or more groups, the tags to be removed include at least one secondary tag for each group. Moreover, the tags to be removed may include only the remaining tags excluding itself in the secondary tag groups including itself for each tag. As described with respect to FIG. 2, the tags to be removed may include a tag having a low sequence number among the tags of the secondary tag groups that do not include itself for each tag. The tags to be removed are not limited to these, and may include a tag having a high sequence number among the tags of the secondary tag groups that do not include itself for each tag.

The relevant tags determined in the step S200 are a final set of tags in which some tags have been removed from the extracted primary tag for each tag. At this time, the tag having no the primary tag itself has no relevant tag. In the above-described example, Tag 9 has no primary tag, no secondary tag, and no relevant tag. For the tag having no relevant tag, when there are plural secondary tags classified into one or more groups, the step S200 determines the remaining tags excluding at least one tag for each group as a relevant tag. In the above-described example, the relevant tag of Tag 9 is not present. In this case, the step S200 may determine tags 1, 3, 5, 6, 7, and 8 as the relevant tag of Tag 9 by excluding at least one tag for each secondary tag group.

Therefore, in the above-described example, the finally determined relevant tags for each tag are shown in the above Table 5.

The step S200 further includes a step S240 of specifying a relevant tag number that determines a set of relevant tags that has had removed some tags from the extracted primary tags for each tag, and that specifies the number (count) of the relevant tags.

Based on the finally determined relevant tags for each tag as shown in Table 5 above, the number (count) of the relevant tags specified for each tag in the step S240 is shown in the above Table 6.

Referring again to FIG. 3, the step S300 determines one or more among the plurality of tags as an independent tag based on the relevant tag. Specifically, when a count of the relevant tags of a specific tag is less than a specific percentage relative to the entire number of tags, the step S300 may determine the specific tag as an independent tag. Conversely, when the count is greater than or equal to (i.e., not less than) the specific percentage, the step S300 may determine the specific tag as a dependent tag.

A tag type determined for each tag by the step S300 is shown in the above Table 7.

The step S300 determines a specific tag as an independent tag when the count of the relevant tags of the specific tag is less than a specific percentage relative to the entire number of tags (ten, in this example), and the specific percentage may be 20%, for example. Therefore, in the above-described example, when the count of the relevant tags is less than two, the specific tag may be determined as an independent tag. Here, Tag 7 having less than two relevant tags is an independent tag, and Tags 1, 2, 3, 4, 5, 6, 8, and 10 each having two or more relevant tags are dependent tags.

However, as described with respect to FIG. 1, Tag 9 may be determined as an independent tag in the above-described example, even if it has two or more relevant tags, since Tag 9 is a tag having no primary tag. That is, when a tag has no primary tag extracted in the step S210, the step S300 determines such a tag as an independent tag.

As a result, the plant abnormality prediction method determines a relevant tag for each tag, and determines whether or not it is an independent tag or a dependent tag for each tag. Here, the relevant tag for any one tag is an input tag for predicting the any one tag. At this time, the plant abnormality prediction method performs k-NN-based prediction by using as an input the relevant tag for the tag determined as the independent tag. In addition, the plant abnormality prediction method performs k-NN-based prediction, MLRM-based prediction, or ensemble-based prediction by using as an input the relevant tag for the tag determined as the dependent tag. Therefore, an operator unfamiliar with the plant system may set a tag that is not helpful for the abnormal prediction of a specific tag as an input in order to diagnose the abnormality of the specific tag. Even if tags that are not related to the tag that is an abnormality prediction target are input, the plant abnormality prediction method extracts the relevant tag that is helpful for the abnormality prediction of the tag for each tag according to the above-described procedure, such that the unrelated tags are naturally excluded from the relevant tag.

That is, according to the plant abnormality prediction method, even if the tags are randomly input, the tags having causation with each other are grouped to set a relationship equation between the grouped tags, such that the tag may be input without understanding the plant system.

As described above, those skilled in the art to which the present disclosure pertains will appreciate that the present disclosure may be implemented in other detailed forms without changing the technical spirit or essential characteristic of the present disclosure. Accordingly, it is to be understood that the aforementioned embodiments are only illustrative, but are not limiting or restrictive. Furthermore, the flowcharts shown in the drawings are merely sequential order illustrated to achieve the most preferred results in implementing the present disclosure, and other additional steps may be provided or some of the steps may be deleted.

Technological characteristics described in this specification and an implementation for executing the technological characteristics may be implemented using a digital electronic circuit, may be implemented using computer software, firmware or hardware including the structure described in this specification and structural equivalents thereof, or may be implemented using a combination of one or more among them. Furthermore, the implementation for executing the technological characteristics described in this specification may be implemented using a computer program product, that is, a module regarding computer program instructions encoded on a kind of program storage media in order to control the operation of a processing system or for execution by the processing system.

As described above, the detailed terms proposed in this specification are not intended to limit the present disclosure. Accordingly, although the present disclosure has been described in detail with reference to the aforementioned embodiments, those skilled in the art to which the present disclosure pertains may reconstruct, change and modify the embodiments without departing from the scope of the present disclosure.

The scope of the present disclosure is defined by the following appended claims rather than the detailed description, and the present disclosure should be construed as covering all modifications or variations derived from the meaning and scope of the appended claims and their equivalents.

What is claimed is:

1. A system for predicting plant abnormality, the system comprising:
a computer processor configured to:
receive a plurality of tags from a plant under operation;
calculate a correlation coefficient for each of two tags among the plurality of tags, the two tags among the plurality of tags being randomly set for input to the computer processor as by an operator unfamiliar with the system;
determine a relevant tag for each tag of the plurality of tags by comparing the correlation coefficient with a reference value, the relevant tag determined by extracting a primary tag for each tag of the plurality of tags and extracting a secondary tag for each tag of the plurality of tags, the extracted primary tag being a tag wherein an absolute value of the correlation coefficient is less than a first upper limit and is not less than a first lower limit;
remove tags from the extracted primary tag for each tag, the removed tags including at least one tag among the secondary tags; and
determine one or more among the plurality of tags as an independent tag based on the relevant tag,
wherein the relevant tags determined by the relevant tag determining are a final set of tags in which some tags have been removed from the extracted primary tag for each tag, the final set of tags determined by specifying a relevant tag for each tag of the plurality of tags, the specified relevant tags having had tags removed from the extracted primary tag,
specifying a count of the relevant tags, and
determining a specific tag as the independent tag when the count of the relevant tags of the specific tag is less than a specific percentage relative to an entire number of tags, and
wherein the computer processor is further configured to perform k-NN-based prediction by using as an input the relevant tags for the specific tag determined as the independent tag.

2. The system of claim 1, wherein the extracted secondary tag is a tag wherein an absolute value of the correlation coefficient is less than a second upper limit and is not less than a second lower limit.

3. The system of claim 2, wherein the first lower limit is less than the second lower limit.

4. The system of claim 2, wherein the first upper limit is equal to the second upper limit.

5. The system of claim 1, wherein, for plural secondary tags classified into one or more groups, the removed tags include at least one secondary tag for each group.

6. The system of claim 1,
wherein the computer processor is further configured to determine the specific tag as a dependent tag when the count of the relevant tags of the specific tag is not less than the specific percentage relative to the entire number tags, and
wherein the computer processor is further configured to perform one of MLRM-based prediction, ensemble-based prediction, and the k-NN-based prediction by using as an input the relevant tags for the specific tag determined as the dependent tag.

7. A method for predicting plant abnormality in a plant system, the method comprising:

receiving a plurality of tags from a plant under operation;

calculating a correlation coefficient for each of two tags among the plurality of tags;

calculating a correlation coefficient for each of two tags among the plurality of tags, the two tags among the plurality of tags being randomly set for input to the plant system as by an operator unfamiliar with the plant system;

determining a relevant tag for each tag of the plurality of tags by comparing the correlation coefficient with a reference value, the relevant tag determined by extracting a primary tag for each tag of the plurality of tags and extracting a secondary tag for each tag of the plurality of tags, the extracted primary tag being a tag wherein an absolute value of the correlation coefficient is less than a first upper limit and is not less than a first lower limit;

removing tags from the extracted primary tag for each tag, the removed tags including at least one tag among the secondary tags; and determining one or more among the plurality of tags as an independent tag based on the relevant tag, wherein the relevant tags determined by the relevant tag determining are a final set of tags in which some tags have been removed from the extracted primary tag for each tag, the final set of tags determined by specifying a relevant tag for each tag of the plurality of tags, the specified relevant tags having had tags removed from the extracted primary tag, specifying a count of the relevant tags, and determining a specific tag as the independent tag when the count of the relevant tags of the specific tag is less than a specific percentage relative to an entire number of tags, and wherein the method further comprises performing k-NN-based prediction by using as an input the relevant tags for the specific tag determined as the independent tag.

8. The method of claim 7, wherein the extracted secondary tag is a tag wherein an absolute value of the correlation coefficient is less than a second upper limit and is not less than a second lower limit.

9. The method of claim 8, wherein the first lower limit is less than the second lower limit.

10. The method of claim 8, wherein the first upper limit is equal to the second upper limit.

11. The method of claim 7, wherein, for plural secondary tags classified into one or more groups, the removed tags include at least one secondary tag for each group.

12. The method of claim 7, wherein the independent tag determining determines the specific tag as a dependent tag when the count of the relevant tags of the specific tag is not less than the specific percentage relative to the entire number tags, and wherein the method further comprises performing one of MLRM-based prediction, ensemble-based prediction, and the k-NN-based prediction by using as an input the relevant tags for the specific tag determined as the dependent tag.

\* \* \* \* \*